June 13, 1961 | S. LOEWE | 2,988,295

MAGAZINE FOR MAGNETIC TAPE REELS

Original Filed Oct. 5, 1954

Inventor:

Siegmund Loewe

United States Patent Office 2,988,295

Patented June 13, 1961

2,988,295

MAGAZINE FOR MAGNETIC TAPE REELS

Siegmund Loewe, 68 Ridge Road, Yonkers, N.Y.

Original application Oct. 5, 1954, Ser. No. 482,630. Divided and this application Feb. 28, 1958, Ser. No. 718,320

Claims priority, application Germany Oct. 10, 1953

3 Claims. (Cl. 242—55.13)

This application is a division of my application Serial No. 482,630, filed October 5, 1954, now abandoned.

In connection with the marking of specific points on a magnetic tape recording it is desirable to provide a possibility of reading off on a scale with great accuracy the length of tape that has been used up or is still available, as the case may be. This is particularly important for recording purposes in order to be able to determine at any time whether the length of tape still unused in a given case is long enough to permit the recording of a performance, the length of which is known. As already mentioned, measuring or counting devices attached to the recorder are unsuitable since every measurement requires that the magnetic tape be first fully wound. But it is the very task of the case to free the user from this necessity. Accordingly, a measuring device which is as simple as possible must be provided in the case. This is removed with the case and shows at any time how much of the length of the tape is still available for recording. The same measuring device also makes it possible, even though not with the same degree of accuracy, to find specific places on a tape which already has a recording on it. If such a measuring device is to be connected with every case, it must be extremely cheap. In the cases available up to now a transparent scale was inserted in the lid of the case by means of which one could orient oneself approximately. The chief inaccuracy in reading these scales resulted from the fact that proper reading was impossible as a result of the parallax.

In accordance with the invention, in order to prevent this parallax the scale is directly placed on the reel winding.

Figure 1A:
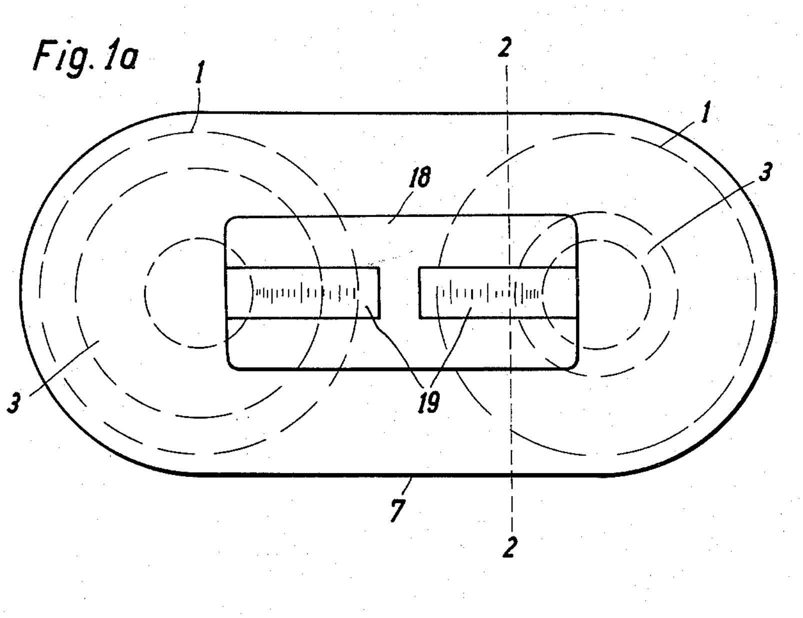
Figure 1B:
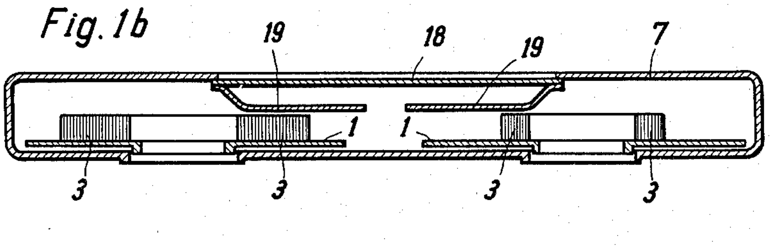
Figure 2:
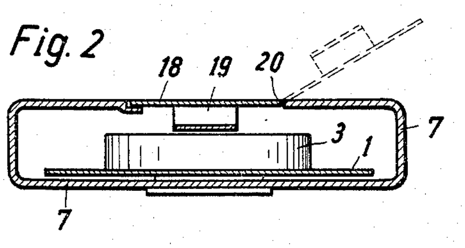

FIG. 1*a* is a top plan view of a magazine embodying the invention,

FIG. 1*b* is a sectional view along the longitudinal axis of the magazine,

FIG. 2 is a sectional view along the line 2—2 of FIG. 1*a*.

In accordance with the invention, the scale 19 in the form of a thin page, for example made of stiff paper, is either directly laid on the wound tape 3 or affixed so near to it obliquely that parallax is prevented. It has been shown that an obliquely-placed scale page permits the reels to turn in both directions without itself causing any noticeable friction or causing any disturbance when turned in the turning direction of the reel. Furthermore, it is possible to attach two scales, i.e. one on each reel, which makes it possible to read at a glance with adequate accuracy either the length of the tape still available, or the playing time, or both, on the scale. The lid of the case 7 has a cut-out portion 18, which can be covered with some transparent material. According to FIG. 2, 18 is the transparent plate attached to the case lid by means of a spring-mounted hinge 20. On it the spring-mounted scale 19 is attached with very light pressure or without any pressure at all close to the surface of the spool 3. The transparent plate 18 can have, with the aid of the spring hinge 20, two stable end positions, one in a closed state and the other in a position indicated by the dotted lines. The device makes it possible to remove the plate 18 for the purpose of making markings.

What I claim is:

1. A magazine for magnetic tape reels comprising in combination a lid containing an observing window, and at least one separate, non-movable scale plate containing a straight-line calibration arranged in a radial direction to said reels and arranged parallel and at a distance to said observing window and in close proximity to the flat surface of a wound-on helix of tape.

2. A magazine according to claim 1, including a hinge carrying said scale plate mounted on said magazine lid near a margin of said window.

3. A magazine according to claim 2, including a spring arranged between said scale plate and said hinge.

References Cited in the file of this patent

UNITED STATES PATENTS

| | | |
|---|---|---|
| 1,796,136 | Alland | Mar. 10, 1931 |
| 2,043,914 | Wittel | June 9, 1936 |
| 2,484,552 | Camras | Oct. 11, 1949 |
| 2,668,021 | Gleason | Feb. 2, 1954 |

FOREIGN PATENTS

| | | |
|---|---|---|
| 714,053 | Germany | Nov. 20, 1941 |